United States Patent
Jeon

(10) Patent No.: US 12,179,804 B2
(45) Date of Patent: Dec. 31, 2024

(54) DRIVER ASSISTANCE APPARATUS AND DRIVER ASSISTANCE METHOD

(71) Applicant: HL KLEMOVE CORP., Incheon (KR)

(72) Inventor: Kyunggeun Jeon, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 473 days.

(21) Appl. No.: 17/707,284

(22) Filed: Mar. 29, 2022

(65) Prior Publication Data
US 2022/0306164 A1     Sep. 29, 2022

(30) Foreign Application Priority Data
Mar. 29, 2021   (KR) .......................... 10-2021-0040350

(51) Int. Cl.
*B60W 50/14*    (2020.01)
*B60W 30/12*    (2020.01)
*B60W 60/00*    (2020.01)
*G06V 20/56*    (2022.01)

(52) U.S. Cl.
CPC ........ *B60W 60/0053* (2020.02); *B60W 30/12* (2013.01); *B60W 50/14* (2013.01); *G06V 20/588* (2022.01); *B60W 2420/403* (2013.01); *B60W 2540/18* (2013.01); *B60W 2552/53* (2020.02); *B60W 2710/20* (2013.01)

(58) Field of Classification Search
CPC .. B60W 60/0053; B60W 30/12; B60W 50/14; B60W 2552/53; B60W 2420/403; B60W 2540/18; B60W 2710/20; G06V 20/588
See application file for complete search history.

(56) References Cited

FOREIGN PATENT DOCUMENTS

| KR | 10-2019568 | 11/2019 |
|---|---|---|
| KR | 10-2020-0053442 | 5/2020 |

*Primary Examiner* — Mathew Franklin Gordon
(74) *Attorney, Agent, or Firm* — Womble Bond Dickinson (US) LLP

(57) ABSTRACT

Provided is a driver assistance apparatus, including: a camera mounted on a vehicle and configured to have a front field of view of the vehicle and acquire image data; and a controller including a processor configured to process the image data, wherein the controller is configured to: determine a pair of boundary lines based on the processing of the image data, control a steering device of the vehicle so that the vehicle travels within a zone defined by the pair of boundary lines, based on the vehicle being deviated from the zone, and change the pair of boundary lines to extend the zone, based on a driver not holding a steering wheel.

19 Claims, 6 Drawing Sheets

[Fig. 1]
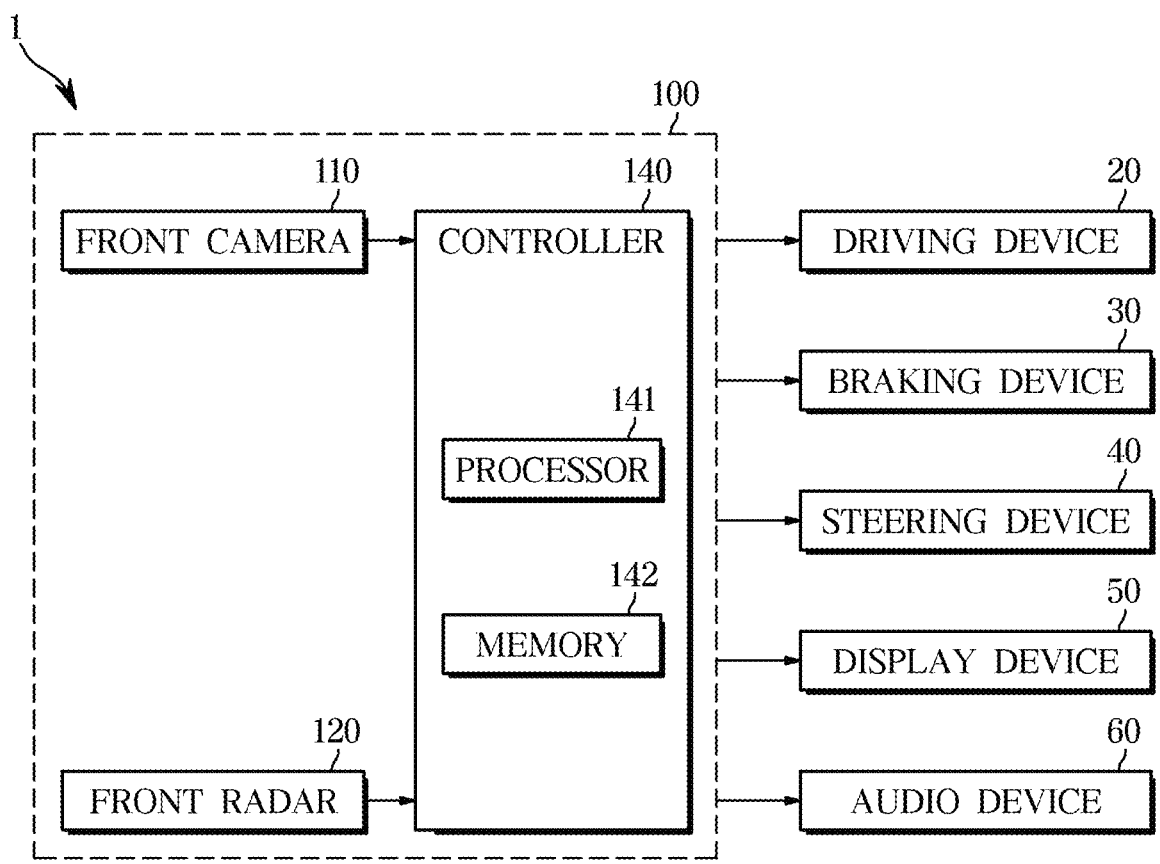

[Fig. 2]
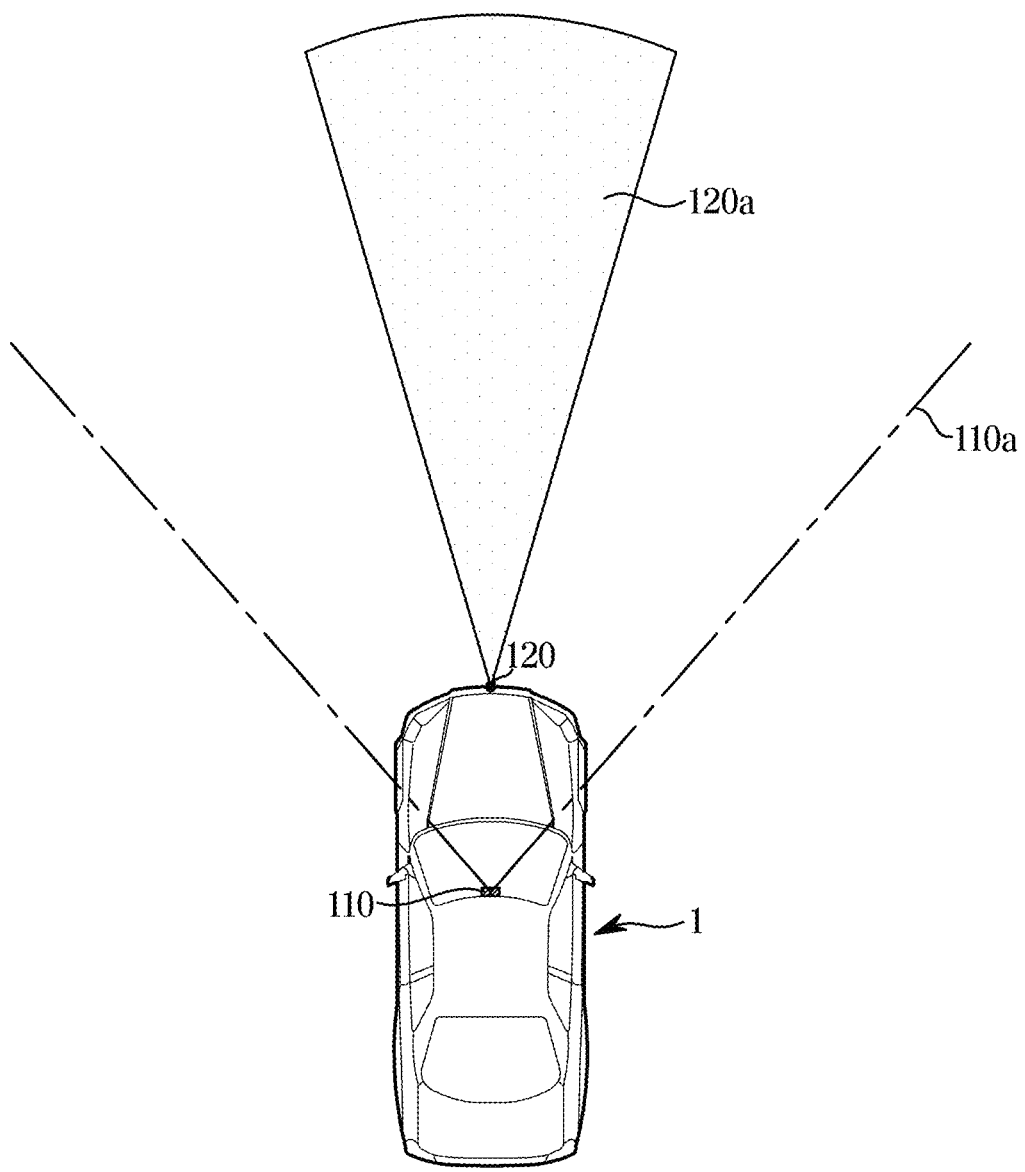

[Fig. 3]
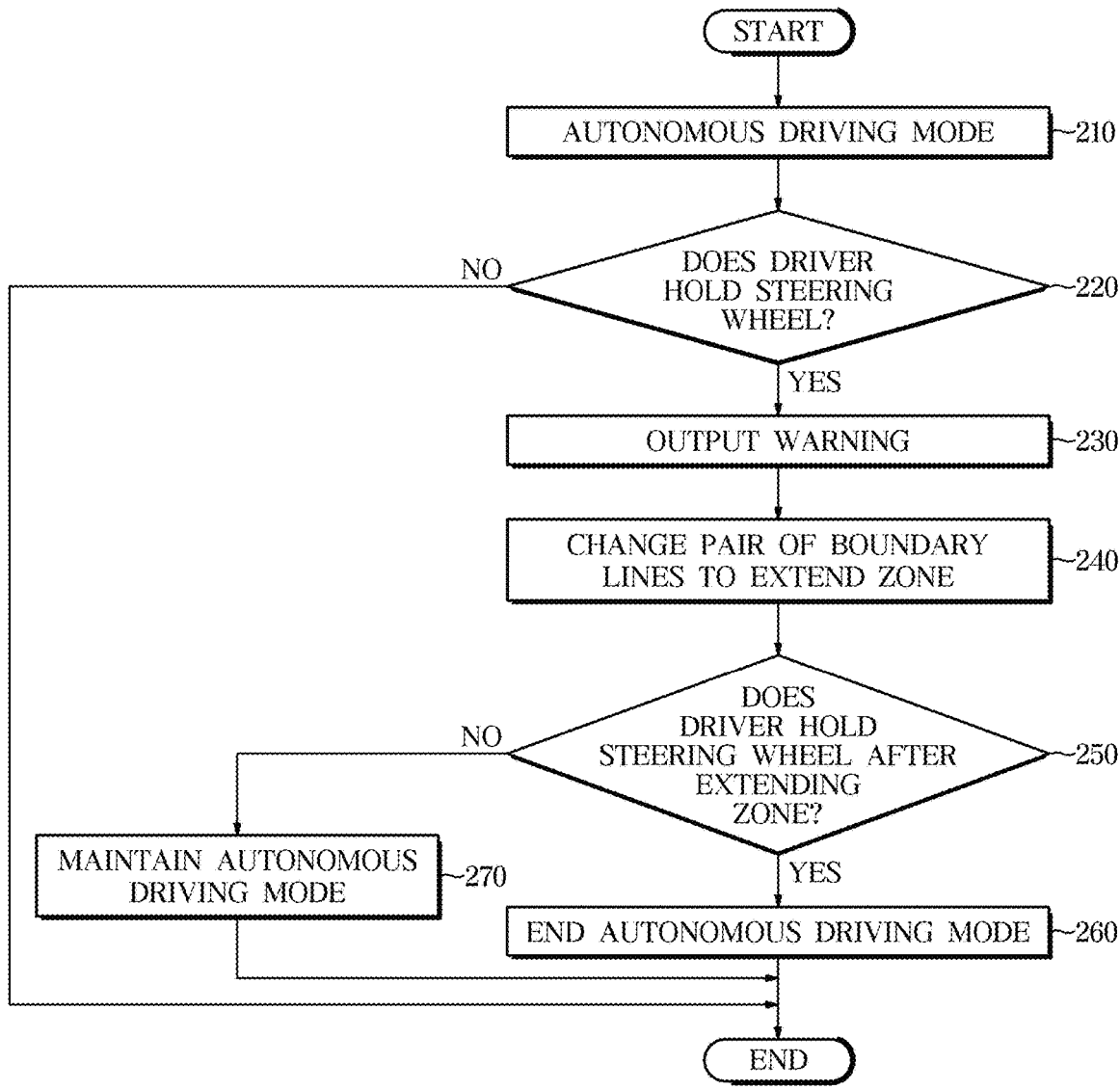

[Fig. 4]
(a)
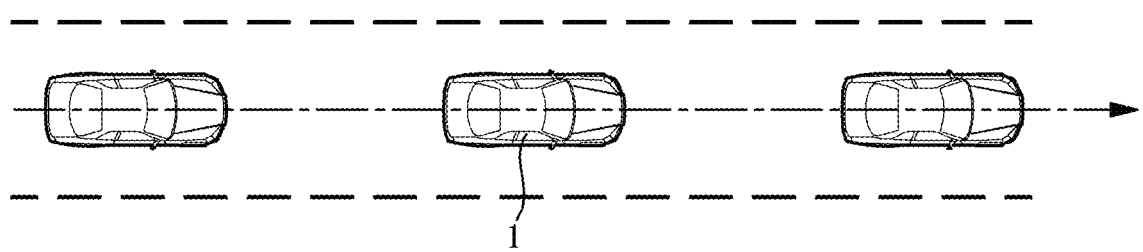
1
(b)
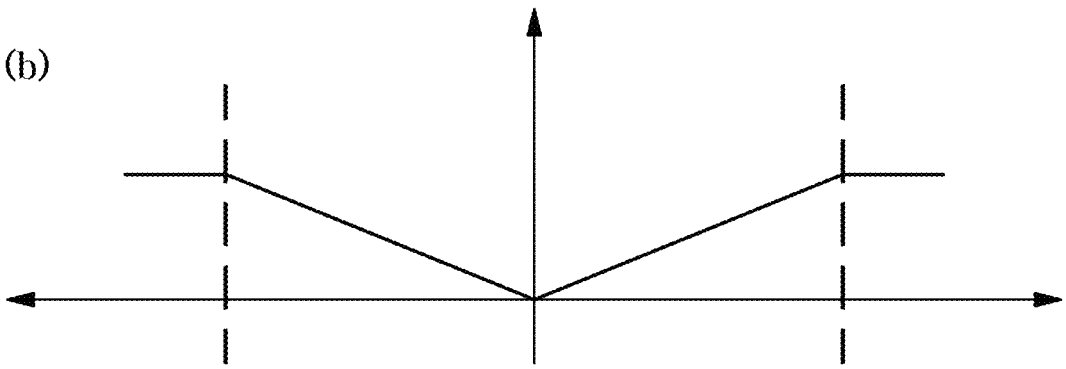

[Fig. 5]
(a)
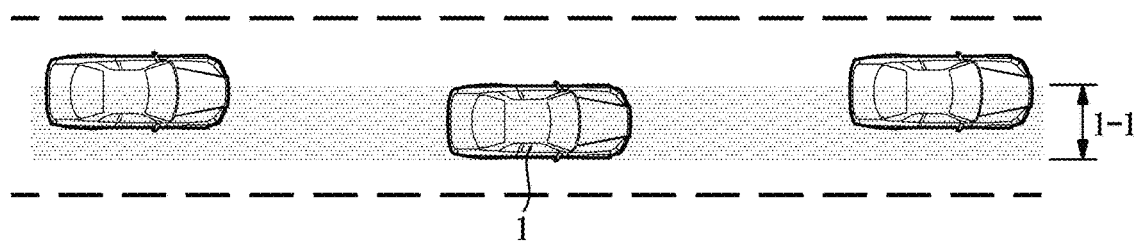
(b)
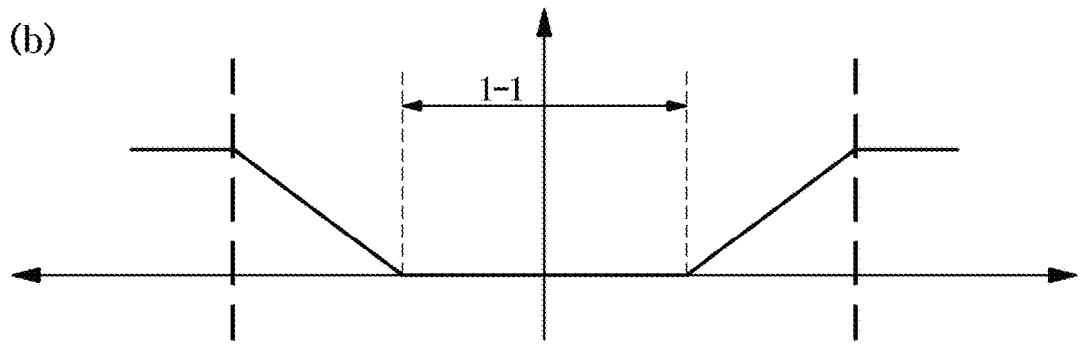

[Fig. 6]
(a)
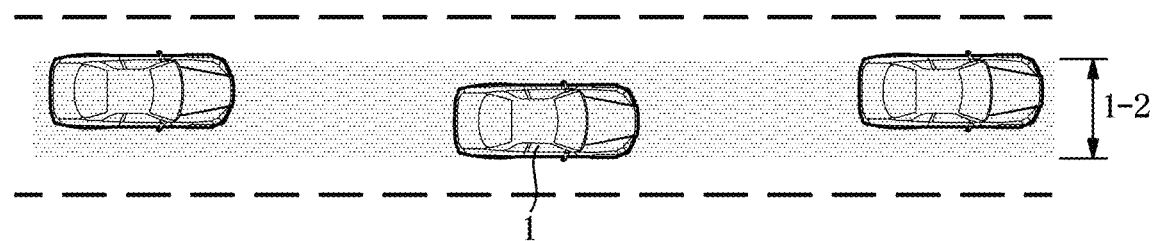
(b)
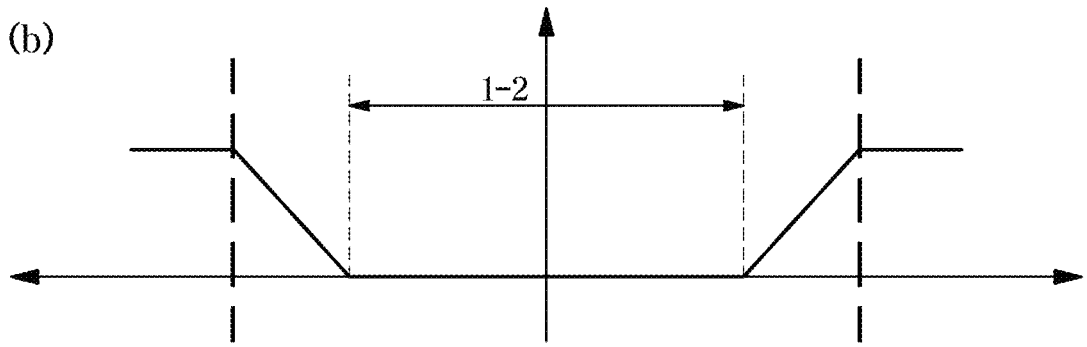

DRIVER ASSISTANCE APPARATUS AND DRIVER ASSISTANCE METHOD

CROSS-REFERENCE TO RELATED APPLICATION

This application is based on and claims priority under 35 U.S.C. § 119 to Korean Patent Application No. 10-2021-0040350, filed on Mar. 29, 2021 in the Korean Intellectual Property Office, the disclosure of which is incorporated herein by reference.

BACKGROUND

1. Technical Field

The disclosure relates to a driver assistance apparatus and a driver assistance method.

2. Background Art

A hands-off warning may be visually or audibly output when a driver does not hold a steering wheel for a certain period of time. A vehicle may determine whether a driver holds a steering wheel using a torque sensor, static sensor, infrared sensor, etc., provided in the vehicle. When the driver does not grip a steering wheel, the vehicle may output a warning to hold the steering wheel.

In current technologies, however, since an autonomous driving mode is released when a lane centering control of autonomous driving system is being operated, a sudden release of the autonomous driving mode may make a driver unable to cope with an unexpected situation.

SUMMARY

An aspect of the disclosure provides a driver assistance apparatus and a driver assistance method that may extend a zone of a vehicle before ending an autonomous driving mode in order to prevent an accident like a lane departure at a sudden release of the autonomous driving mode.

According to an aspect of the disclosure, there is provided a driver assistance apparatus, including: a camera mounted on a vehicle and configured to have a front field of view of the vehicle and acquire image data; and a controller including a processor configured to process the image data, wherein the controller is configured to: determine a pair of boundary lines based on the processing of the image data, control a steering device of the vehicle so that the vehicle travels within a zone defined by the pair of boundary lines, based on the vehicle being deviated from the zone, and change the pair of boundary lines to change the zone, based on a driver not holding a steering wheel.

The controller is configured to output a warning, based on the driver not holding the steering wheel.

The controller is configured to change the pair of boundary lines to extend the zone to a first zone for a predetermined period of time from a point in time that the warning is output.

The controller is configured to change the pair of boundary lines to extend the zone to a second zone, after a predetermined period of time has elapsed from a point in time that the zone is extended to the first zone.

Each of the first zone and the second zone is between left and right lines of a lane in which the vehicle travels, and the second zone is wider than the first zone.

The controller is configured to determine whether the driver holds the steering wheel after extending the zone, and end an autonomous driving mode, based on the driver not holding the steering wheel.

The controller is configured to determine whether the driver holds the steering wheel after extending the zone, and maintain an autonomous driving mode, based on the driver holding the steering wheel.

The controller is configured to change the pair of boundary lines so that the vehicle does not cross left and right lines of a lane in which the vehicle travels.

According to another aspect of the disclosure, there is provided a driver assistance method including a camera mounted on a vehicle and configured to have a surrounding field of view of the vehicle, the driver assistance method including: determining a pair of boundary lines based on processing of image data; controlling a steering device of the vehicle so that the vehicle travels within a zone defined by the pair of boundary lines, based on the vehicle being deviated from the zone; and changing the pair of boundary lines to change the zone, based on a driver not holding a steering wheel.

The driver assistance method further includes outputting a warning, based on the driver not holding the steering wheel.

The driver assistance method further includes changing the pair of boundary lines to extend the zone to a first zone for a predetermined period of time from a point in time that the warning is output.

The driver assistance method further includes changing the pair of boundary lines to extend the zone to a second zone, after a predetermined period of time has elapsed from a point in time that the zone is extended to the first zone.

Each of the first zone and the second zone is between left and right lines of a lane in which the vehicle travels, and the second zone is wider than the first zone.

The driver assistance method further includes determining whether the driver holds the steering wheel after extending the zone, and ending an autonomous driving mode, based on the driver not holding the steering wheel.

The driver assistance method further includes determining whether the driver holds the steering wheel after extending the zone, and maintaining an autonomous driving mode, based on the driver holding the steering wheel.

The driver assistance method further includes changing the pair of boundary lines so that the vehicle does not cross left and right lines of a lane in which the vehicle travels.

According to still another aspect of the disclosure, there is provided a computer-readable recording medium storing a program for implementing a driver assistance method, the method including: acquiring image data by a camera configured to have a surrounding field of view of a vehicle; processing the image data; determining a pair of boundary lines based on the processing of the image data; controlling a steering device of the vehicle so that the vehicle travels within a zone defined by the pair of boundary lines, based on the vehicle being deviated from the zone; and changing the pair of boundary lines to change the zone, based on a driver not holding a steering wheel.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of a vehicle according to an embodiment;

FIG. 2 illustrates fields of view of a camera and a radar included in a driver assistance apparatus according to an embodiment;

FIG. 3 is a flowchart illustrating a driver assistance method according to an embodiment;

FIG. 4 is a diagram illustrating a conventional driving environment of a vehicle;

FIG. 5 is a diagram illustrating a driving environment of a vehicle according to a driver assistance method according to an embodiment; and FIG. 6 a diagram illustrating a driving environment of a vehicle according to a driver assistance method according to an embodiment.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 illustrates a configuration of a vehicle according to an embodiment.

FIG. 2 illustrates fields of view of a camera and a radar included in a driver assistance apparatus according to an embodiment.

As shown in FIG. 1, a vehicle 1 includes a driving device 20, a braking device 30, a steering device 40, a display device 50, an audio device 60 and a driver assistance apparatus 100. The above devices may communicate with each other through a vehicle communication network (NT). For example, the electric devices 20, 30, 40, 50, 60 and 100 included in the vehicle 1 may transmit/receive data through Ethernet, media oriented systems transport (MOST), FlexRay, controller zone network (CAN), local interconnect network (LIN), and the like.

The driving device 20 may move the vehicle 1, and may include, for example, an engine, an engine management system (EMS), a transmission and a transmission control unit (TCU).

The engine may generate power for driving the vehicle 1 and the EMS may control the engine in response to a driver's acceleration intention through an accelerator pedal or a request from the driver assistance apparatus 100.

The transmission may decelerate and transmit the power generated by the engine to vehicle wheels and the TCU may control the transmission in response to a driver's shift command through a shift lever and/or a request from the driver assistance apparatus 100.

The braking device 30 may stop the vehicle 1 and include, for example, a brake caliper and an electronic brake control module (EBCM).

The brake caliper may decelerate or stop the vehicle 1 by using friction with a brake disc, and the EBCM may control the brake caliper in response to a driver's braking intention through a brake pedal and/or a request from the driver assistance apparatus 100.

For instance, the EBCM may receive a deceleration request including a deceleration from the driver assistance apparatus 100, and control the brake caliper electrically or through hydraulic pressure to decelerate the vehicle 1 based on the requested deceleration.

The steering device 40 may include an electronic power steering control module (EPS).

The steering device 40 may change a driving direction of the vehicle 1. The EPS may assist operations of the steering device 40 so that a driver may easily manipulate a steering wheel according to a driver's steering intention through the steering wheel. Also, the EPS may control the steering device 40 in response to a request from the driver assistance apparatus 100. For example, the EPS may receive a steering request including a steering torque from the driver assistance apparatus 100, and control the steering device 40 so that the vehicle 1 is steered based on the requested steering torque.

The display device 50 may include a cluster, head-up display, center fascia monitor, and the like, and provide the driver with various information and entertainment through images and sound. For example, the display device 50 may provide the driver with driving information of the vehicle 1, route information to a destination, a warning message, and the like.

The audio device 60 may include a plurality of speakers, and provide the driver with various information and entertainment through sound. For instance, the audio device 60 may provide the driver with driving information of the vehicle 1, route information to a destination, a warning message, and the like.

The driver assistance apparatus 100 may provide the driver with a variety of functions. For example, the driver assistance apparatus 100 may provide functions such as a lane departure warning (LDW), a lane keeping assist (LKA), a lane keeping assist system (LKAS), a high beam assist (HBA), an autonomous emergency braking (AEB), a traffic sign recognition (TSR), an adaptive cruise control (ACC), a blind spot detection (BSD), and the like.

When the driver crosses a line regardless of the driver's intention while the LKAS is being operated, the driver assistance apparatus 100 may output a warning, and assist in keeping a lane by automatically controlling the steering wheel. Also, the driver assistance apparatus 100 may determine and set a pair of boundary lines to prevent the vehicle 1 from crossing the lines, and control to maintain the lane by allowing the vehicle 1 to travel within the pair of boundary lines.

The driver assistance apparatus 100 includes a front camera 110, a front radar 120 and a controller 140. The driver assistance apparatus 100 is not limited to that illustrated in FIG. 1, and may further include a light detection and ranging (lidar) that detects an object around the vehicle 1 by scanning around the vehicle 1.

As shown in FIG. 2, the front camera 110 may have a field of view 110*a* facing the front of the vehicle 1. For example, the front camera 110 may be installed on a front windshield of the vehicle 1.

The front camera 110 may photograph the front of the vehicle 1 and acquire image data on the front of the vehicle 1. The image data on the front of the vehicle 1 may include information about other vehicles, pedestrians, cyclists, or lane lines (markers distinguishing lanes on a road) located in front of the vehicle 1.

For instance, when changing lanes, a collision risk may be detected through the front camera 110. The image data on the front of the vehicle 1 may be acquired to detect the collision risk of the vehicle 1.

The front camera 110 may include a plurality of lens and image sensors. The image sensors may include a plurality of photodiodes converting light into an electrical signal, and the plurality of photodiodes may be arranged in a two-dimensional (2D) matrix.

The front camera 110 may be electrically connected to a controller 140. For example, the front camera 110 may be connected to the controller 140 via a vehicle communication network (NT), a hard wire, or a printed circuit board (PCB). The front camera 110 may transmit the image data on the front of the vehicle 1 to the controller 140.

As shown in FIG. 2, the front radar 120 may have a field of sensing 120*a* facing the front of the vehicle 1. For example, the front radar 120 may be installed in a grille or a bumper of the vehicle 1.

The front radar 120 may include a transmission antenna (or a transmission antenna array) that transmits a transmission wave toward the front of the vehicle 1, and a receiving antenna (or a receiving antenna array) that receives a reflected wave reflected from an object. The front radar 120 may acquire detection data from the transmission wave transmitted by the transmission antenna and the reflected wave received by the receiving antenna. The detection data may include distance information and speed information about other vehicles, pedestrians or cyclists located in front of the vehicle 1. The front radar 120 may calculate a relative distance to an object based on a phase difference (or a time difference) between the transmission wave and the reflected wave, and calculate a relative speed of the object based on a frequency difference between the transmission wave and the reflected wave.

For instance, when the vehicle 1 changes lanes, the front radar 120 may acquire the detection data for detecting a collision risk, by transmitting the transmission wave toward the front of the vehicle 1 and receiving the reflected wave reflected from an object.

For example, the front radar 120 may be connected to the controller 140 via a vehicle communication network, a hard wire, or a PCB. The front radar 120 may transmit the detection data to the controller 140.

The controller 140 may be electrically connected to the front camera 110 and the front radar 120. Also, the controller 140 may be connected to a navigation, the driving device 20, the braking device 30, the steering device 40, the display device 50 and the audio device 60 via a vehicle communication network.

The controller 140 may include a processor 141 and a memory 142.

The processor 141 may process the image data of the front camera 110 and the detection data of the front radar 120 and generate a driving signal, a braking signal and a steering signal for controlling the driving device 20, the braking device 30 and the steering device 40, respectively. For example, the processor 141 may include an image processor for processing the image data of the front camera 110, and/or a digital signal processor for processing the detection data of the front radar 120, and/or a micro control unit (MCU) for generating the driving signal/braking signal/steering signal.

The processor 141 may detect an object in front of the vehicle 1 (e.g., other vehicles, pedestrians, cyclists, etc.) based on the image data of the front camera 110 and the detection data of the front radar 120.

The processor 141 may acquire information about a relative location (a distance from the vehicle and an angle with respect to a driving direction) and types (e.g., whether an object is another vehicle, a pedestrian, a cyclist, or the like) of the object in front of the vehicle 1, based on the image data of the front camera 110. The processor 141 may acquire information about a relative location (a distance from the vehicle and an angle with respect to a driving direction) and a relative speed of an object located in front of or at the rear of the vehicle 1, based on the detection data of the front radar 120. Also, the processor 141 may match the object detected by the detection data and the object detected by the image data, and acquire the types, relative location, and relative speed of the objects around the vehicle 1 based on a result of matching.

The processor 141 may generate the driving signal, the braking signal and the steering signal based on the relative location and the relative speed of the object in front. For example, the processor 141 may transmit, to the driving device 20 and/or the braking device 30, the driving signal and/or the braking signal for allowing a distance to a preceding vehicle (or a time taken to reach a location of the preceding vehicle) to be a distance set by the driver. The processor 141 may calculate a time to collision (TTC) (or a distance to collision (DTC)) between the vehicle 1 and the object located in front of or at the rear of the vehicle 1 based on the location (distance) and relative speed of the object in front or at the rear of the vehicle 1, and provide the driver with a warning about a collision or transmit the braking signal to the braking device 30 based on comparison between the TTC and a reference value. In addition, when a collision with the object located in front of or at the rear of the vehicle 1 is determined based on the TTC or DTC, the processor 141 may transmit the steering signal to the steering device 40 for collision avoidance with the object.

The processor 141 may identify whether a brake lamp of a preceding vehicle is turned on based on the image data of the front camera 110, and whether the preceding vehicle is decelerated based on the detection data of the front radar 120.

For example, the front camera 110 may include a color filter. Depending on a type of the color filter, an image sensor may output red image data/green image data/blue image data (RGB image data) or black-and-white image data/red image data. For instance, the processor 141 may receive the red image data from the front camera 110, and identify whether the brake lamp of the preceding vehicle is turned on based on the red image data. Also, the processor 141 may identify a relative speed of the preceding vehicle based on the detection data of the front radar 120, and identify an acceleration (or deceleration) of the preceding vehicle based on a change in relative speed.

The processor 141 may identify a black ice section in front of the vehicle 1 based on whether the brake lamp of the preceding vehicle is turned on and the acceleration (or deceleration) of the preceding vehicle. The processor 141 may provide the braking device 30 with the braking signal for reducing a speed of the vehicle 1 based on the identification of the black ice section.

The memory 142 may store a program and/or data for the processor 141 to process the image data, a program and/or data for the processor 141 to process the detection data, and a program and/or data for processor 141 to generate the driving signal and/or the braking signal and/or the steering signal.

The memory 142 may temporarily store the image data received from the front camera 110 and/or the detection data received from the front radar 120. Also, the memory 142 may temporarily store a processing result of the image data and/or the detection data by the processor 141.

The memory 142 may include a volatile memory such as a static random access memory (S-RAM) and dynamic random access memory (D-RAM), and a non-volatile memory such as a flash memory, a read only memory (ROM), an erasable programmable read only memory (EPROM), and the like.

As described above, the controller 140 may transmit the braking signal to the braking device 30 based on whether a collision with an object is predicted. Also, the controller 140 may transmit the braking signal to the braking device 30 based on the detection of the black ice section in front.

The driver assistance apparatus 100 is not limited to that illustrated in FIG. 2, and may further include a lidar that detects an object around the vehicle 1 by scanning around the vehicle 1.

The driver assistance apparatus 100 may include the front camera 110 and the controller 140. The front camera 110 is mounted on the vehicle 1, has a front field of view of the vehicle 1 and acquires image data. The controller 140 includes the processor 141 for processing the image data. Also, during autonomous driving, the controller 140 may determine a pair of boundary lines based on the processing of the image data, and control the steering device 40 of the vehicle 1 so that the vehicle 1 travels within a zone defined by the pair of boundary lines, based on the vehicle 1 being deviated from the zone. Also, the controller 140 may determine whether the driver holds a steering wheel, and change the pair of boundary lines to extend the zone in a lane in which the vehicle 1 travels, based on the driver not holding the steering wheel. After extending the zone, the controller 140 may determine whether to end an autonomous driving mode based on whether the driver holds the steering wheel.

The controller 140 may use an electric steering system to determine whether the driver holds the steering wheel. Specifically, when a steering wheel rotation torque, which is a force that the driver rotates the steering wheel, is less than or equal to a preset reference, the controller 140 determines that the driver does not hold the steering wheel, and when the steering wheel rotation torque is greater than or equal to the preset reference, determines that the driver holds the steering wheel.

Also, by attaching a sensor to the steering wheel, the controller 140 may determine whether the driver holds the steering wheel through the sensor.

Determining whether the driver holds the steering wheel may be made in various ways, without being limited to the method described above.

When the driver holds the steering wheel during autonomous driving, the controller 140 may perform an autonomous driving for lane centering that keeps the vehicle 1 centered in a lane in which the vehicle 1 travels. Specifically, the controller 140 may determine the pair of boundary lines on left and right sides of the vehicle 1 so that the vehicle 1 does not deviate from the lane in which the vehicle 1 travels.

The controller 140 may determine a zone between the pair of boundary lines, as a zone defined for the vehicle 1 to travel.

Also, the controller 140 may calculate the zone defined by the pair of boundary lines, based on at least one of a distance between left and right lines of a lane in which the vehicle 1 travels or location information of the left and right lines.

For example, during autonomous driving, the controller 140 may confirm the distance between the left and right lines of the lane in which the vehicle 1 travels based on the vehicle 1. A distance between the pair of boundary lines acquired by the controller 140 may be less than the distance between the left and right lines of the lane. That is, the controller 140 may determine the pair of boundary lines having a width smaller than the distance between the left and right lines of the lane.

Also, the controller 140 may acquire the location information of the left and right lines of the lane in which the vehicle 1 travels. The pair of boundary lines acquired by the controller 140 may be located inside the left and right lines. That is, the controller 140 may determine the pair of boundary lines positioned within the left and right lines.

When the driver does not hold the steering wheel during autonomous driving, the controller 140 may determine that the vehicle 1 is likely to deviate from the lane in which the vehicle 1 travels, and output a warning for notifying the driver of a risk of deviating from the lane. Specifically, the controller 140 may output a warning message on the display device 50, and output a warning or message through the audio device 60.

The controller 140 may change the zone of the vehicle 1 for a predetermined period of time from a point in time that the warning is output. Specifically, the controller 140 may change the pair of boundary lines, set within the lane, to extend the zone of the vehicle 1 to a first zone. The controller 140 may transmit steering torque information for extending to the first zone, to the steering device 40.

In this instance, the controller 140 may extend the zone defined by the pair of boundary lines so that the vehicle 1 does not deviate from the lane in which the vehicle 1 travels.

That is, the controller 140 may change the pair of boundary lines, set within the lane in which the vehicle 1 travels, for the predetermined period of time from the point in time that the warning is output, thereby extending a zone where the vehicle 1 may travel.

When the driver still does not hold the steering wheel even after extending the zone defined by the pair of boundary lines to the first zone, the controller 140 may extend the zone of the vehicle 1 to a second zone.

Also, the controller 140 may extend the zone defined by the pair of boundary lines to the second zone from the first zone, after the predetermined period of time has elapsed from the point in time that the warning is output. The controller 140 may change the pair of boundary lines, set within the lane in which the vehicle 1 travels, to extend the zone of the vehicle 1 to the second zone from the first zone.

Here, the second zone may be wider than the first zone, and each of the first zone and the second zone may be between the left and right lines of the lane in which the vehicle 1 travels.

The controller 140 may determine whether the driver holds the steering wheel again, after extending the zone of the vehicle 1 to the second zone. When the driver still does not hold the steering wheel even after extending the zone defined by the pair of boundary lines to the second zone, the controller 140 may end the autonomous driving.

Also, the controller 140 may output a notification indicating that the autonomous driving mode ends.

When the driver holds the steering wheel after extending to the second zone, the controller 140 may maintain the autonomous driving mode mode.

FIG. 3 is a flowchart illustrating a driver assistance method according to an embodiment.

The driver assistance apparatus 100 may confirm whether the vehicle 1 is operating an autonomous driving mode (210).

The driver assistance apparatus 100 may determine whether a driver holds a steering wheel during the autonomous driving mode (220).

When it is determined that the driver does not hold the steering wheel, the driver assistance apparatus 100 may output a warning (230).

When it is determined that driver holds the steering wheel, the driver assistance apparatus 100 may maintain the autonomous driving mode.

The driver assistance apparatus 100 may change a pair of boundary lines, set within a lane in which the vehicle 1 travels, for a predetermined period of time from a point in time that the warning is output, in order to extend a zone where the vehicle 1 travels to a first zone. In this instance, the driver assistance apparatus 100 may extend the zone within a range that does not deviate from the lane in which the vehicle 1 travels.

Also, when it is determined that the driver still does not hold the steering wheel even after extending to the first zone, the driver assistance apparatus 100 may change the pair of boundary lines, set within the lane, to extend the zone where the vehicle 1 travels to a second zone from the first zone (240).

For example, the driver assistance apparatus 100 may extend the zone where the vehicle 1 travels to the first zone, for 30 seconds from the point in time that the warning is output. When it is determined that the driver still does not hold the steering wheel even after 30 seconds has elapsed from the point in time that the warning is output, the driver assistance apparatus 100 may change the pair of boundary lines, set within the lane, to extend the zone where the vehicle 1 travels to the second zone from the first zone.

In this instance, the second zone may be wider than the first zone, and each of the first zone and the second zone may be between left and right lines of the lane in which the vehicle 1 travels.

Accordingly, the driver assistance apparatus 100 may extend a zone where the vehicle 1 may travel in advance before ending the autonomous driving mode, thereby preventing an accident that may suddenly occur shortly after the autonomous driving mode ends.

The driver assistance apparatus 100 may determine whether the driver holds the steering wheel again, after extending to the second zone (250).

When it is determined that the driver still does not hold the steering wheel, the driver assistance apparatus 100 may output a warning, and also end the autonomous driving mode of the vehicle 1 (260).

When it is determined that the driver holds the steering wheel, the driver assistance apparatus 100 may maintain the autonomous driving mode of the vehicle 1 (270).

In this instance, the driver assistance apparatus 100 may change the pair of boundary lines, set within the lane, to reduce the extended zone again. That is, when the driver holds the steering wheel, the driver assistance apparatus 100 may control to perform an autonomous driving for lane centering that keeps the vehicle 1 centered in the lane in which the vehicle 1 travels.

FIG. 4 is a diagram illustrating a conventional driving environment of a vehicle.

FIGS. 5 and 6 are diagrams illustrating a driving environment of a vehicle according to a driver assistance method according to an embodiment.

As shown in FIG. 4A, the driver assistance apparatus 100 may control to perform an autonomous driving for lane centering that keeps the vehicle 1 centered in a lane in which the vehicle 1 travels during autonomous driving.

As shown in FIG. 4B, a horizontal axis may be a distance between left and right lines based on the lane in which the vehicle 1 travels, and a vertical axis may be a steering torque. Referring to FIG. 4B, while the vehicle 1 performs an autonomous driving for lane centering, the steering torque may be 0.

As shown in FIG. 5A, when a driver of the vehicle 1 in an autonomous driving mode does not hold a steering wheel, a zone in which the vehicle 1 travels may be extended without instantly ending the autonomous driving mode. Referring to FIG. 5A, the driver assistance apparatus 100 may extend the zone in which the vehicle 1, with lane centering operated, as shown in FIG. 4A, travels to a first zone 1-1.

In this instance, the first zone 1-1 may be between the left and right lines of the lane in which the vehicle 1 travels.

The driver assistance apparatus 100 may change a pair of boundary lines, set within the lane, in order to extend the zone of the vehicle 1 to the first zone 1-1. Referring to FIG. 5B, the driver assistance apparatus 100 may change the pair of boundary lines, set within the lane, by setting a steering torque to 0 in the first zone 1-1, and thus the zone in which the vehicle 1 travels may be extended to the first zone 1-1.

As shown in FIG. 6A, when the driver still does not hold the steering wheel after extending to the first zone 1-1, the driver assistance apparatus 100 may extend the zone in which the vehicle 1 travels again, without instantly ending the autonomous driving mode. Referring to FIG. 6A, the driver assistance apparatus 100 may extend to a second zone 1-2 from the first zone 1-1, as shown in FIG. 5A.

In this instance, the second zone 1-2 may be between the left and right lines of the lane. Also, the second zone 1-2 may be wider than the first zone 1-1. More specifically, the second zone 1-2 may include an area to a location closer to the left and right lines of the lane than the first zone 1-1 based on a center of the lane.

The driver assistance apparatus 100 may change the pair of boundary lines, set within the lane, in order to extend the zone in which the vehicle 1 travels to the second zone 1-2 from the first zone 1-1. Referring to FIG. 6B, the driver assistance apparatus 100 may change the pair of boundary lines, set within the lane, by setting a steering torque to 0 in the second zone 1-2, and thus the zone in which the vehicle 1 travels may be extended to the second zone 1-2.

As described above, the driver assistance apparatus 100 may extend the zone of the vehicle 1 twice. Also, the driver assistance apparatus 100 may gradually extend the zone in which the vehicle 1 travels with time from a point in time that the driver does not hold the steering wheel.

In addition, the driver assistance apparatus 100 may extend the zone in which the vehicle 1 travels, based on a point in time when a warning is output because the driver does not hold the steering wheel, and also extend the zone in which the vehicle 1 travels, based on a point in time that a second warning is output.

As is apparent from the above, according to the embodiments of the disclosure, a zone of a vehicle may be extended in advance before ending an autonomous driving mode, thereby preventing an accident that may suddenly occur shortly after the autonomous driving mode ends.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure.

Therefore, embodiments have not been described for limiting purposes.

What is claimed is:

1. A driver assistance apparatus, comprising:
    a camera mounted on a vehicle and configured to have a front field of view of the vehicle and acquire image data; and
    a controller comprising a processor configured to process the image data,
    wherein the controller is configured to:
    determine a pair of boundary lines based on the processing of the image data,
    control a steering device of the vehicle so that the vehicle travels within a zone defined by the pair of boundary lines, based on the vehicle being deviated from the zone, and
    change the pair of boundary lines to change the zone, based on a driver not holding a steering wheel.

2. The driver assistance apparatus of claim 1, wherein the controller is configured to output a warning, based on the driver not holding the steering wheel.

3. The driver assistance apparatus of claim 2, wherein the controller is configured to change the pair of boundary lines to extend the zone to a first zone for a predetermined period of time from a point in time that the warning is output.

4. The driver assistance apparatus of claim 3, wherein the controller is configured to change the pair of boundary lines to extend the zone to a second zone, after a predetermined period of time has elapsed from a point in time that the zone is extended to the first zone.

5. The driver assistance apparatus of claim 4, wherein each of the first zone and the second zone is between left and right lines of a lane in which the vehicle travels, and the second zone is wider than the first zone.

6. The driver assistance apparatus of claim 1, wherein the controller is configured to determine whether the driver holds the steering wheel after extending the zone, and end an autonomous driving mode, based on the driver not holding the steering wheel.

7. The driver assistance apparatus of claim 1, wherein the controller is configured to determine whether the driver holds the steering wheel after extending the zone, and maintain an autonomous driving mode, based on the driver holding the steering wheel.

8. The driver assistance apparatus of claim 1, wherein the controller is configured to change the pair of boundary lines so that the vehicle does not cross left and right lines of a lane in which the vehicle travels.

9. The driver assistance apparatus of claim 1, wherein the controller is configured to calculate the zone defined by the pair of boundary lines, based on at least one of a distance between left and right lines of a lane in which the vehicle travels or location information of the left and right lines.

10. A driver assistance method comprising a camera mounted on a vehicle and configured to have a surrounding field of view of the vehicle, the driver assistance method comprising:
    determining a pair of boundary lines based on processing of image data;
    controlling a steering device of the vehicle so that the vehicle travels within a zone defined by the pair of boundary lines, based on the vehicle being deviated from the zone; and
    changing the pair of boundary lines to change the zone, based on a driver not holding a steering wheel.

11. The driver assistance method of claim 10, further comprising:
    outputting a warning, based on the driver not holding the steering wheel.

12. The driver assistance method of claim 11, further comprising:
    changing the pair of boundary lines to extend the zone to a first zone for a predetermined period of time from a point in time that the warning is output.

13. The driver assistance method of claim 12, further comprising:
    changing the pair of boundary lines to extend the zone to a second zone, after a predetermined period of time has elapsed from a point in time that the zone is extended to the first zone.

14. The driver assistance method of claim 13, wherein each of the first zone and the second zone is between left and right lines of a lane in which the vehicle travels, and the second zone is wider than the first zone.

15. The driver assistance method of claim 10, further comprising:
    determining whether the driver holds the steering wheel after extending the zone, and ending an autonomous driving mode, based on the driver not holding the steering wheel.

16. The driver assistance method of claim 10, further comprising:
    determining whether the driver holds the steering wheel after extending the zone, and maintaining an autonomous driving mode, based on the driver holding the steering wheel.

17. The driver assistance method of claim 10, further comprising:
    changing the pair of boundary lines so that the vehicle does not cross left and right lines of a lane in which the vehicle travels.

18. The driver assistance method of claim 10, further comprising:
    calculating the zone defined by the pair of boundary lines, based on at least one of a distance between left and right lines of a lane in which the vehicle travels or location information of the left and right lines.

19. A computer-readable recording medium storing a program for implementing a driver assistance method, the method comprising:
    acquiring image data by a camera configured to have a surrounding field of view of a vehicle;
    processing the image data;
    determining a pair of boundary lines based on the processing of the image data;
    controlling a steering device of the vehicle so that the vehicle travels within a zone defined by the pair of boundary lines, based on the vehicle being deviated from the zone; and
    changing the pair of boundary lines to change the zone, based on a driver not holding a steering wheel.

* * * * *